No. 890,617. PATENTED JUNE 16, 1908.
M. DÉRI.
ALTERNATING CURRENT MOTOR.
APPLICATION FILED DEC. 16, 1902.

2 SHEETS—SHEET 1.

Witnesses:
Inventor
Max Déri
By James L. Norris
Atty.

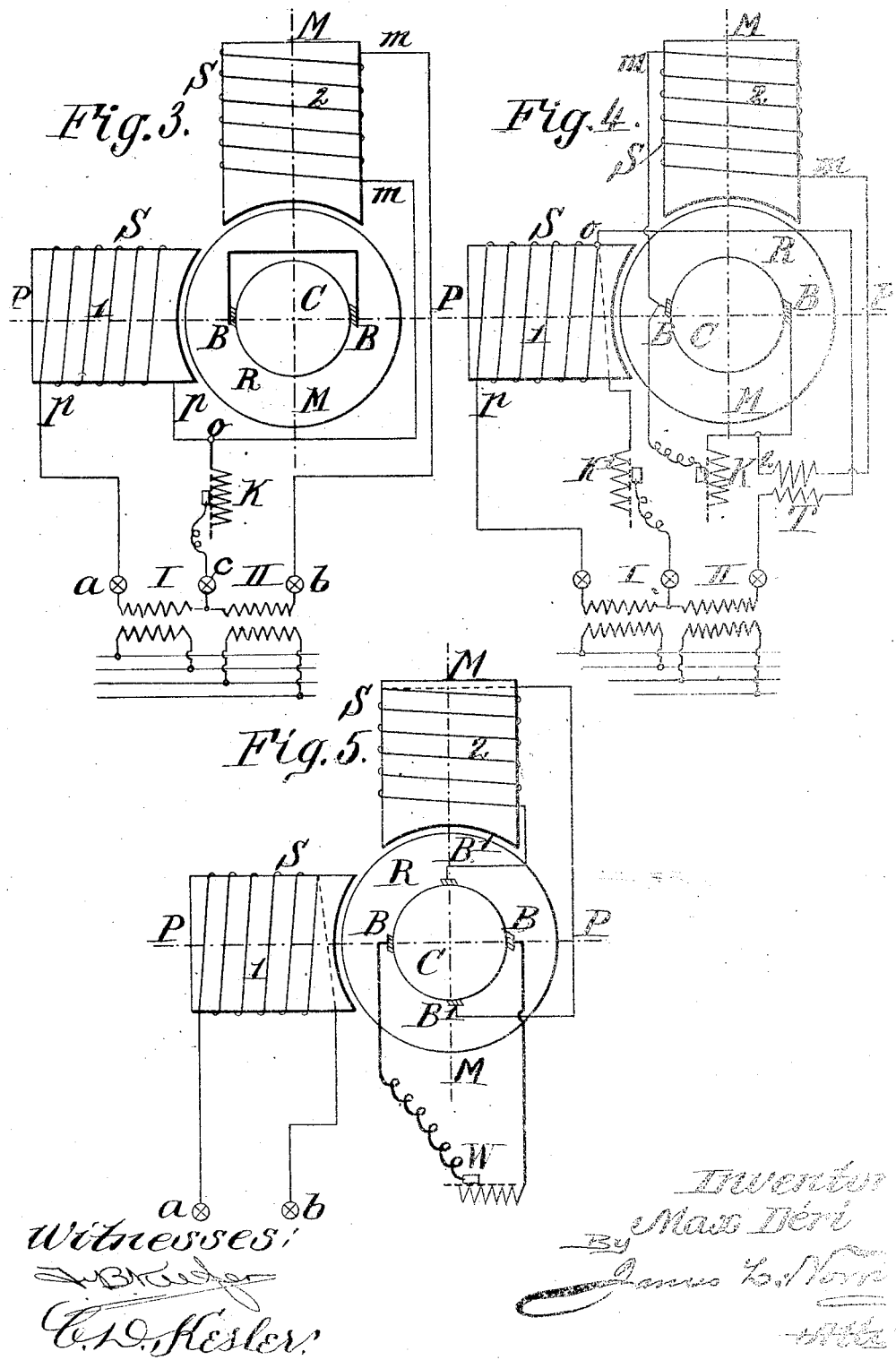

UNITED STATES PATENT OFFICE.

MAX DÉRI, OF VIENNA, AUSTRIA-HUNGARY, ASSIGNOR TO STANLEY ELECTRIC MANUFACTURING COMPANY, A CORPORATION OF NEW JERSEY.

ALTERNATING-CURRENT MOTOR.

No. 890,617.  Specification of Letters Patent.  Patented June 16, 1908.

Application filed December 16, 1902. Serial No. 135,404.

*To all whom it may concern:*

Be it known that I, MAX DÉRI, subject of the Emperor of Austria-Hungary, residing at Vienna, in the Province of Lower Austria, in the Empire of Austria-Hungary, have invented certain new and useful Improvements in Alternating-Current Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to alternating-current motors of the type having an armature provided with a commutator. Among the well-known forms of single-phase motors of this type is the ordinary series motor, which has the disadvantage that the armature current is taken directly from the line at line voltage; and also the so-called repulsion motor, in which, as ordinarily arranged, the armature is provided with short-circuiting brushes arranged at an angle to the line of field magnetization, which is not convenient for regulation of the speed and power, because the armature current and the field magnetization of the motor cannot be independently regulated.

The commutator motor of the present invention has its armature winding provided with brushes and connections adapted to short-circuit the winding through the brushes, and two stator windings, one arranged to produce a magnetization on the line of the armature short-circuit, and the other, which may be called the field winding, arranged to produce its magnetization on a line displaced ninety electrical degrees from the line of magnetization of the other winding. This arrangement renders it possible to regulate the field and the working current independently of each other, by operating either on the field circuit or on the armature circuit.

Figure 1:
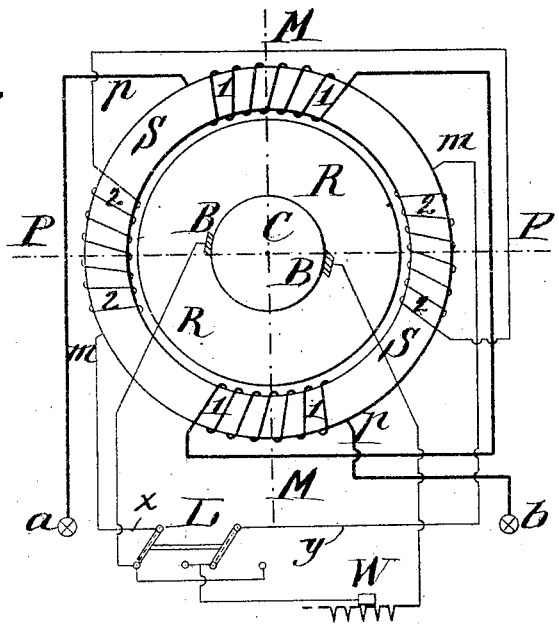
Figure 2:
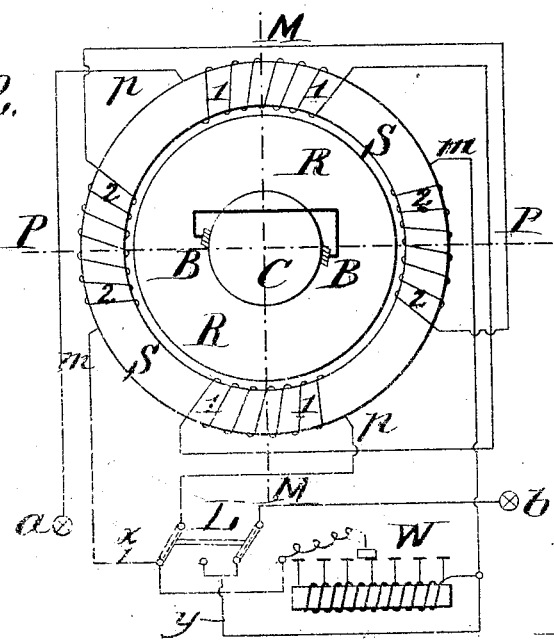

My invention will best be understood by reference to the accompanying drawings, in which Figure 1 shows diagrammatically an alternating-current motor of the commutator type arranged in accordance with my invention, the field winding being in series with the armature winding; Fig. 2 shows a modification, in which the field winding is in series with the other stator winding; Fig. 3 shows a modification adapted for operation on two-phase circuits; Fig. 4 shows a modification, in which the series connection of the field winding is made through a transformer; Fig. 5 shows a further modification.

In the accompanying drawings Fig. 1 illustrates an arrangement of the motor by means of a diagram of windings and connections. R is the armature with commutator C and brushes B B. The stator S which is preferably made of the closed form usual for induction motors, is provided with two groups of windings having their axes shifted by a determined angle, generally by $\frac{\pi}{2}$, relatively to each other. The winding marked 1 with the leads $p$ and $p$ and the polar axis P—P forms the primary winding of a transformer whose secondary is formed by the armature winding determined by the axis of the brushes. These two axes generally are coincident with each other. The winding marked 2 with the leads $m$ and $m$ serves for the excitation of the motor field having the axis M—M. The magnetizations along these two axes may be conceived as existing separately, but in reality they produce a resultant magnetization on a line somewhere between the two axes,—that is, the winding 2 shifts the magnetization of winding 1. L is the reversing switch by means of which the terminal connections of winding 2 may be reversed so as to shift the magnetization of winding 1 in either direction. W is a variable ohmic or inductive resistance in circuit with which are the terminals $x$ $y$ of the auxiliary winding 2.

The working winding 1 connected to the distributing circuit induces the electromotive force of the armature. The armature is closed through the exciting winding 2, whereby there is produced in the stator transversely to the armature currents a flux of the same phase as these currents.

Another arrangement of the connections is shown in Fig. 2. In this case the armature is short circuited between the brushes and the two stator windings are fed from the distributing circuit. These two windings $n$ $y$ either be connected together in series or concatenated as shown in the figure, or in multiple are or connected together indirectly through transformers. W is a variable inductive resistance which is assumed by way of example to be a shunt with the field winding.

The reference letters are the same in Figs. 1 and 2. In both figures the two-polar arrangement and the ring-winding have been shown by way of example. The application to a greater number of poles and to other types of windings is obvious.

There may further be employed several exciting windings of which for instance, one is connected in series with the working winding, and the other is connected to the armature. In this case the motor field may also be regulated by connecting or combining the several groups of exciting windings with each other in different manners.

In order to get the greatest torque efficiency between the armature current and the magnetic field the phases of the armature potential and of the potential of the exciting winding should be as much as possible the same at starting and should become more and more different with increase in speed. Fig. 3 shows an example of the arrangement of connections for the purpose of varying this phase difference. The stator windings are shown in this case, for greater clearness, as bobbins situated on one side only, but with the same reference letters as in the previous figures. The series-connected windings 1 and 2 are joined at their ends $p$ and $m$ to the outer pole terminals $a$ and $b$ of a two-phase transformer concatenated at $c$. The connection $c$ between the point of connection of the secondaries of the two-phase transformer and the point of connection $o$ of the windings 1 and 2 is made through a variable resistance K. The circuit of this resistance is opened at starting so that the windings 1 and 2 in series are connected to the secondaries of the transformer in series, and as the motor speeds up the connection between the points $c$ and $o$ is closed through the resistance K and the resistance is gradually cut out of circuit. The relative phase of the potentials impressed upon the windings 1 and 2 is thereby varied. In this manner the magnetic field is excited at first in series by the main current and finally by an independent potential which may have a shifted phase.

Another example of the excitation with varying difference of phase is shown in Fig. 4, where two switching devices K' and K² are operated and a transformer is used for exciting the field.

The object of the difference of phase employed in these arrangements is not to produce a rotary field; the motor retains its character of a single-phase machine. For this reason it is not necessary that the fields P and M should be of equal strength, nor that they should lie at right angle to each other. In many cases on the contrary it will be preferable to make the field P stronger or weaker than M, or the angle between the two greater or less than $\frac{\pi}{2}$, but particular care should be taken to insure the possibility of making the motor field M independently variable for the purpose of regulating the speed.

The difference of phase may be effected by using polyphase currents or may be produced by artificial shifting devices from single phase currents. It may also be produced from the motor itself in the following manner. On the commutator, or if desired, on a separate commutator or on the commutator of a separate armature winding, in addition to the main brushes B and B which convey the working currents from the armature, there are arranged auxiliary brushes B' and B' transversely to the polar axis P. Between the latter brushes there is produced a potential which increases with the speed of the armature and which has a phase of the desired difference from the phase of the armature potential. In Fig. 5 there are shown by way of example two sets of brushes arranged at right angle to one another. One pair of brushes B and B is connected through the switch W, and the other pair of brushes B' and B' is connected through the exciting winding 2. At starting the exciting brushes B' and B' are situated on the axis P so that the armature potential and the exciting potential are the same. At the same time, the connection W between the brushes B and B is broken. With the increase in the speed all the brushes are shifted and at the same time the connection W is gradually closed. At full speed the short-circuited main brushes B and B are situated on the axis P and the auxiliary exciting brushes B' and B' are on the axis M. The latter position of the brushes for full speed is shown in Fig. 5.

With an excitation of the field with shifted phase it is also possible to employ two or several exciting windings of which one is connected as shown in Fig. 1 or in Fig. 2, and provides chiefly for the starting effort, while the other exciting winding is connected to the shifted phase or to the auxiliary brushes and effects essentially the excitation at full speed. By means of changing or combining the two methods of excitation it is not necessary to shift the brushes on starting the motor.

Claim.

1. In an alternating current motor, a primary winding adapted to be connected to a source of current, a secondary winding provided with a commutator and brushes in inductive relation thereto, a transformer having its primary connected in series with one of said windings, and a magnetizing winding connected to the secondary of said transformer.

2. In an alternating current motor, a primary winding adapted to be connected to a source of current, a secondary winding provided with a commutator and brushes in inductive relation thereto, a transformer having its primary connected in series with one of said windings, and means for producing with the current in the secondary of said transformer a magnetization of the motor at an angle to the magnetization produced by said windings.

3. In an alternating current motor, a primary winding adapted to be connected to a source of current, a secondary winding provided with a commutator and brushes in inductive relation thereto, a transformer having its primary connected in series with one of said windings, and a magnetizing winding adapted to produce a magnetization of the motor at an angle to the magnetization of the first mentioned windings and connected to the secondary of said transformer.

4. In an alternating current motor, a primary winding adapted to be connected to a source of current, a secondary winding provided with a commutator and brushes in inductive relation thereto, a transformer having its primary connected in series with one of said windings, a magnetizing winding connected to the secondary of said transformer, and means for varying the amount of current flow in the magnetizing winding.

5. In an alternating current motor, a primary winding adapted to be connected to a source of current, a secondary winding provided with a commutator and brushes, in inductive relation thereto, a transformer having its primary connected in series with one of said windings, a magnetizing winding connected to the secondary of said transformer, and means for varying the amount and phase of current in the magnetizing winding.

6. In an alternating current motor, a primary winding adapted to be connected to a source of current, a secondary winding provided with a commutator and brushes in inductive relation thereto, a transformer having its primary connected in series with one of said windings, a magnetizing winding connected to the secondary of said transformer, and means for varying the impedance of the circuit connected to said secondary.

7. In an alternating current motor, a primary winding adapted to be connected to a source of current, a secondary winding provided with a commutator and brushes in inductive relation thereto, means for controlling the amount of current flow in said secondary winding, a transformer having its primary connected in series with one of said windings, and a magnetizing winding connected to the secondary of said transformer.

8. In an alternating current motor, a primary winding adapted to be connected to a source of current, a secondary winding provided with a commutator and brushes in inductive relation thereto, means for controlling the amount of current flow in said secondary winding, a transformer having its primary connected in series with one of said windings, and a magnetizing winding connected to the secondary of said transformer.

9. In an alternating current motor, a primary winding adapted to be connected to a source of current, a secondary winding provided with a commutator and brushes in inductive relation thereto, a magnetizing winding, means for energizing said magnetizing winding inductively by the current in one of the first named windings, and a reversing switch in circuit with said magnetizing winding.

10. In an alternating current motor, a primary winding adapted to be connected to a source of current, a secondary winding provided with a commutator and brushes in inductive relation thereto, a magnetizing winding, means for energizing said magnetizing winding inductively by the current in one of the first named windings, and means for varying the amount of current flow in said magnetizing winding.

11. In an alternating current motor, a primary winding adapted to be connected to a source of current, a secondary winding provided with a commutator and brushes in inductive relation thereto, a magnetizing winding adapted to produce a magnetization at an angle to the magnetization produced by the other two windings, said magnetizing winding being connected in series with one of said other windings, and means for varying the relative phase of the potentials impressed on said magnetizing winding and the winding to which it is connected.

12. In an alternating current motor, a primary winding adapted to be connected to a source of current, a secondary winding provided with a commutator and brushes in inductive relation thereto, a transformer having its primary connected in series with said primary winding, a winding connected to the secondary of said transformer and adapted to produce a magnetization at an angle to that produced by the other two windings, and means for varying the relative phase of the potentials impressed on said primary and magnetizing windings.

13. In combination, an alternating-current motor, main field coils, a rotor winding supplied with a commutator and brushes, said brushes being placed on the line of magnetization produced by said main coils, and means for shifting said line of magnetization in either direction.

14. In combination, an alternating-current motor, main field coils, a rotor winding supplied with a commutator and brushes, said brushes being placed on the line of magnetization produced by said main coils, auxiliary coils displaced from the main coils, and means for connecting said auxiliary coils to shift the line of magnetization in either direction.

15. In combination, an alternating-current motor, main field coils, a rotor winding supplied with a commutator and brushes, said brushes being placed on the line of magnetization produced by said main coils, auxiliary coils displaced from the main coils, and means for connecting the auxiliary coils in series with the main coils to shift the line of magnetization in either direction.

16. In combination, in an alternating-current motor, main field coils, a rotor winding supplied with a commutator and short-circuiting brushes, said brushes being placed on the line of magnetization produced by said main coils, auxiliary field coils displaced from the main field coils, and means for connecting said auxiliary coils in circuit with the main field coils to shift the line of magnetization in either direction.

17. In an alternating-current motor, main field coils, an armature provided with a commutator and short circuiting brushes, auxiliary field coils adapted to shift the magnetization of said main coils, and means for reversing the connections of said auxiliary coils relative to said main coils.

18. In an alternating-current motor, main field coils, an armature provided with a commutator and short-circuiting brushes, auxiliary field coils displaced 90 electrical degrees therefrom and adapted to produce a shifting of the magnetization of said main coils, and means for reversing the terminal connections of said auxiliary coils.

19. In an electric motor, a rotor winding provided with a commutator and short-circuiting brushes, main field coils adapted to produce a magnetization on the line of said brushes, auxiliary field coils adapted to shift the magnetization of said main coils, and means for reversing the direction of current flow through said auxiliary coils relative to said main coils.

20. In an alternating-current motor, a rotor winding provided with a commutator and brushes, connections adapted to short-circuit said windings through said brushes, a stator winding arranged to produce a magnetization on the line of the rotor short-circuit, a second stator winding connected in series with one of the other windings and having its line of magnetization displaced ninety electrical degrees from that of the other windings, and means for reversing the terminal connections of the second stator winding.

21. In an alternating-current motor, a rotor winding provided with a commutator and brushes, connections adapted to short-circuit said winding through said brushes, a stator winding arranged to produce a magnetization on the line of the rotor short-circuit, a second stator winding connected in series with one of the other windings and having its line of magnetization displaced ninety electrical degrees from that of the other windings, means for reversing the terminal connections of the second stator winding, and means for varying the amount of current-flow in said second stator winding.

In testimony, that I claim the foregoing as my invention, I have signed my name in presence of two subscribing witnesses.

MAX DÉRI.

Witnesses:
ALVESTO S. HOGUE,
AUGUST FUGGER.